(12) United States Patent
Rudolph et al.

(10) Patent No.: US 8,381,101 B2
(45) Date of Patent: Feb. 19, 2013

(54) SUPPORTING PLATFORM-INDEPENDENT TYPESETTING FOR DOCUMENTS

(75) Inventors: Christopher E. Rudolph, Camas, WA (US); Boris Prokofiev, Richmond, CA (US); Mark A. Ambachtsheer, W. Vancouver (CA)

(73) Assignee: Apple Inc., Cupertino, CA (US)

( * ) Notice: Subject to any disclaimer, the term of this patent is extended or adjusted under 35 U.S.C. 154(b) by 515 days.

(21) Appl. No.: 12/619,106

(22) Filed: Nov. 16, 2009

(65) Prior Publication Data

US 2011/0119573 A1    May 19, 2011

(51) Int. Cl.
*G06F 17/00* (2006.01)
(52) U.S. Cl. ........ 715/269; 715/256; 715/253; 715/243; 715/244; 715/254
(58) Field of Classification Search .......... 715/243, 715/244, 251, 254, 256, 269
See application file for complete search history.

(56) References Cited

U.S. PATENT DOCUMENTS

| | | | |
|---|---|---|---|
| 5,577,177 A * | 11/1996 | Collins et al. | 345/469 |
| 5,781,714 A * | 7/1998 | Collins et al. | 345/471 |
| 6,023,714 A | 2/2000 | Hill | |
| 6,161,107 A | 12/2000 | Stern | |
| 6,446,115 B2 * | 9/2002 | Powers | 709/206 |
| 6,862,371 B2 | 3/2005 | Mukherjee | |
| 6,882,755 B2 | 4/2005 | Silverstain | |
| 7,483,535 B2 | 1/2009 | Mukherjee | |
| 7,492,366 B2 * | 2/2009 | Burago et al. | 345/469.1 |
| 7,522,724 B2 | 4/2009 | Mukherjee | |
| 7,783,969 B1 * | 8/2010 | Menninga | 715/245 |
| 7,999,950 B1 * | 8/2011 | Cohen et al. | 358/1.11 |
| 2002/0143871 A1 * | 10/2002 | Meyer et al. | 709/204 |
| 2002/0184270 A1 * | 12/2002 | Gimson | 707/529 |
| 2004/0044966 A1 | 3/2004 | Malone | |
| 2004/0109020 A1 * | 6/2004 | Song | 345/744 |
| 2004/0216047 A1 * | 10/2004 | Iwata | 715/530 |
| 2005/0147453 A1 * | 7/2005 | Ueno et al. | 400/621 |
| 2007/0055934 A1 | 3/2007 | Adamson, III | |
| 2008/0091784 A1 * | 4/2008 | Sundstrom | 709/206 |

FOREIGN PATENT DOCUMENTS

| | | |
|---|---|---|
| EP | 1343095 A2 | 9/2003 |
| WO | 2004083989 A2 | 9/2004 |
| WO | 2004083989 A3 | 9/2004 |
| WO | 2006090281 A1 | 8/2006 |

OTHER PUBLICATIONS

Bricknell, K.J., "MacIntosh C: A Hobbyist's Guide to Programming the Mac OS in C Version 2.3" 2000, pp. 1-18, http://www.mactech.com/macintosh-c/classic-chap19-1.html.

* cited by examiner

*Primary Examiner* — Stephen Hong
*Assistant Examiner* — Matthew Ludwig
(74) *Attorney, Agent, or Firm* — Womble Carlyle Sandridge & Rice LLP

(57) ABSTRACT

Some embodiments of the present invention provide a system that typesets and renders a document in a platform-independent manner. During operation, the system first obtains the document, wherein the document includes text content and associated style information including one or more fonts. The system also obtains platform-independent font metrics for the one or more fonts, wherein the platform-independent font metrics include information that can be used to determine the positions of individual characters in a rendering of the document. Next, the system uses the platform-independent font metrics to determine how the document is divided into line fragments and pages. Finally, the system uses the determined division while rendering the document, so that the division of the document into line fragments and pages is the same across different computing platforms.

29 Claims, 7 Drawing Sheets

```
addFontMetrics("AmericanTypewriter", {
  familyName: "American Typewriter",
  weight: 5,
  traits: 0,
  1000: {
    font: {asc:904, dsc:-250},
     glyphs: {// glyphId: [horizontal advancement,
vertical advancement, bounds.origin.x, bounds.origin.y,
bounds.size.width, bounds.size.height]
       0: [0, 0, 0, 0, 0, 0],
       8: 0,
       9: 0,
       13: 0,
       29: 0,
       3Z: [250, 0, 0, 0, 0, 0],
       33: [419, 0, 147, -17, 125, 706],
       34: [329, 0, 53, 399, 223, 268],
       35: [600, 0, 32, 0, 545, 667],
       36: [637, 0, 63, -115, 511, 896],
       37: [801, 0, 35, -35, 731, 736],
       38: [819, 0, 37, -6, 774, 705],
       39: [187, 0, 53, 399 , 81, Z68],
       40: [455, 0, 67, -210, 369, 907],
       41: [455, 0, 18, -210, 370, 907],
       42: [637, 0, 154, 317, 329, 372],

SUPPORTING PLATFORM-INDEPENDENT TYPESETTING FOR DOCUMENTS

BACKGROUND

1. Field

The described embodiments relate to techniques for typesetting and rendering documents in computer systems. More specifically, the described embodiments relate to a platform-independent technique for typesetting and rendering documents, which ensures that the dividing of the document into lines and pages is the same across different computer systems and computing platforms.

2. Related Art

The recent proliferation of web browsers and computer networks has made it easy to display the same document on different computing platforms. However, inconsistencies in the way fonts are rendered across different computing platforms can cause the same document to be rendered differently for users of different computing platforms. More specifically, for a given font, the way in which metrics for various font features are interpreted, such as character height, width, leading and white space, can differ between computing platforms. These differences in interpretation can cause individual characters in a document to be rendered at different locations, which can ultimately cause the words in a document to be positioned differently between lines and pages on different computing platforms.

This inconsistent rendering can be a problem for people who are collaborating on a document. For example, if one collaborator points out an error on a specific line of a specific page, another collaborator viewing the same document on a different computing platform may have to first locate the error on a different line of a different page.

Hence, what is needed is a technique for providing consistent rendering for documents across different computer systems and computing platforms.

SUMMARY

Some embodiments of the present invention provide a system that typesets and renders a document in a platform-independent manner. During operation, the system first obtains the document, wherein the document includes text content and associated style information including one or more fonts. The system also generates platform-independent font metrics for the one or more fonts, wherein the platform-independent font metrics include information that can be used to determine the positions of individual characters in a rendering of the document. Next, the system uses the platform-independent font metrics to determine how the document is divided into line fragments and pages. Finally, the system uses the determined division while rendering the document, so that the division of the document into line fragments and pages is the same across different computing platforms.

In some embodiments, while using the platform-independent font metrics to determine how the document is divided into line fragments and pages, the system determines the locations of individual characters within the line fragments in the rendering of the document.

In some embodiments, rendering the document involves performing a high-fidelity rendering, which uses the determined division of the document into line fragments and pages and renders individual characters at the determined locations within the line fragments.

In some embodiments, rendering the document involves performing a lower-fidelity rendering, which uses the determined division of the document into line fragments and pages. However, unlike the high-fidelity rendering, this lower-fidelity rendering does not use the determined locations for the individual characters, but instead allows the renderer to use platform-specific rendering mechanisms to determine the locations of the individual characters within the line fragments.

In some embodiments, rendering the document involves first generating code in a platform-independent markup language, which specifies the rendering for the document, and then executing the generated code to render the document.

In some embodiments, rendering the document involves rendering only a visible portion of the document.

In some embodiments, the system operates within a web browser.

In some embodiments, the system operates within a platform-independent word-processing application that operates within a web browser.

In some embodiments, generating the platform-independent font metrics can involve a number of operations. First, the system selects one or more typefaces and weights. Next, for each typeface and weight, the system selects a standard font size. (The metrics for a given font size can be scaled from this standard font size.) Then, the system enumerates a set of glyphs of interest. Finally, for each enumerated glyph and each font associated with the one or more typefaces, the system queries the font's data to determine one or more metrics for the glyph.

In some embodiments, for each glyph, the platform-independent font metrics specify: a horizontal and a vertical position of a bounding box for the glyph; a horizontal and a vertical size of the bounding box for the glyph; and a horizontal and a vertical advancement for the glyph, which specify how far horizontally and how far vertically a pen position moves after drawing the glyph.

In some embodiments, for each glyph, the platform-independent font metrics take into account: glyph geometry, including height, weight, leading, white space, ligatures, and kerning pairs.

In some embodiments, the platform-independent font metrics are specified using: JavaScript™ Object Notation (JSON); or eXtensible Markup Language (XML).

BRIEF DESCRIPTION OF THE FIGURES

FIG. 3B illustrates exemplary font metrics in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
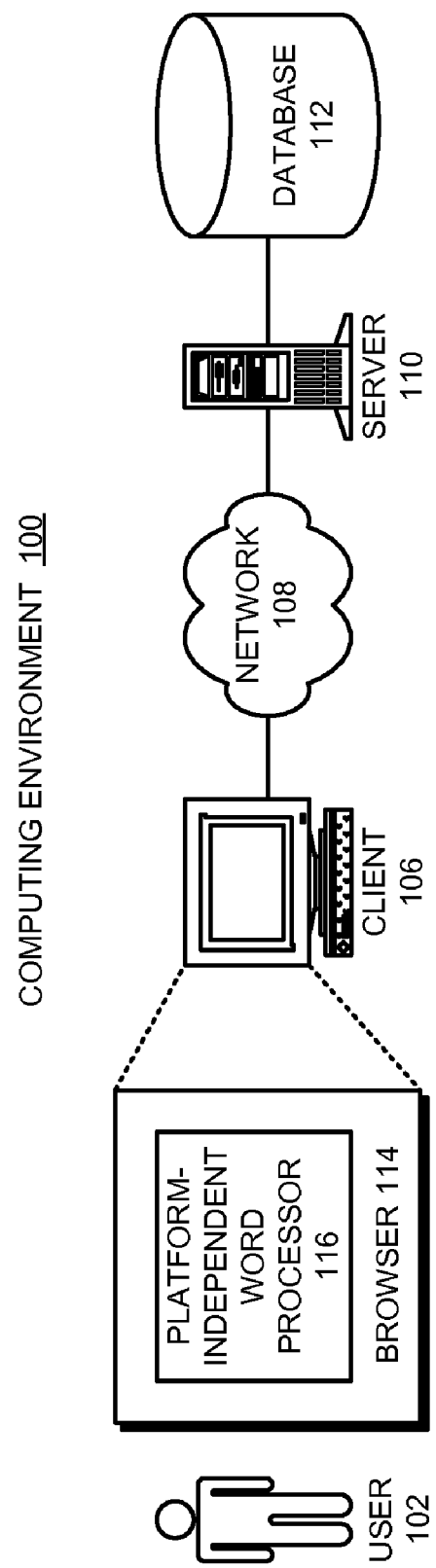
FIG. 1 illustrates a computing environment in accordance with an embodiment of the present invention.

FIG. 1 illustrates a computing environment 100 in accordance with an embodiment of the present invention. Referring to FIG. 1, computing environment 100 includes user 102, client 106, network 108, server 110 and database 112.

Client 106 and server 110 can include any type of computer system, which can be based on a microprocessor, a mainframe computer, a digital signal processor, a portable computing device, a personal organizer, a device controller, or a computational engine within an appliance. Additionally, client 106 can include any node on a network including computational capability and including a mechanism for communicating across network 108. Similarly, server 110 can generally include any node on a network including a mechanism for servicing requests from a client for computational and/or data storage resources.

User 102 can include: an individual, a group of individuals, an organization, a group of organizations, a computing system, a group of computing systems, or any other entity that can interact with computing environment 100.

Network 108 can include any type of wired or wireless communication channel capable of coupling together computing nodes. This includes, but is not limited to, a local area network, a wide area network, or a combination of networks. In one embodiment of the present invention, network 108 includes the Internet. In some embodiments of the present invention, network 108 includes phone and cellular phone networks.

Database 112 can include any type of system for storing data in non-volatile storage. This includes, but is not limited to, systems based upon magnetic, optical, or magneto-optical storage devices, as well as storage devices based on flash memory and/or battery-backed up memory. Note that database 112 can be directly coupled to a server 110, or alternatively, can be coupled to server 110 through a network.

Client 106 hosts a web browser 114. Browser 114 can generally include any program that is capable of displaying web pages containing code specified in a platform-independent markup language. In the embodiment illustrated in FIG. 1, browser 114 hosts a platform-independent word processor 116, which enables user 102 to edit a document. While displaying a document, the platform-independent word processor 116 ensures that the document is divided into line fragments and pages in the same way across different computing platforms. This platform-independent dividing process is described in more detail below.

Although the present invention is described in the context of a browser-based word processing system, the present invention can be more generally applied to any system that renders textual information in a platform-independent manner and is not meant to be limited to word-processing systems or browser-based systems.

Rendering Process

Figure 2:
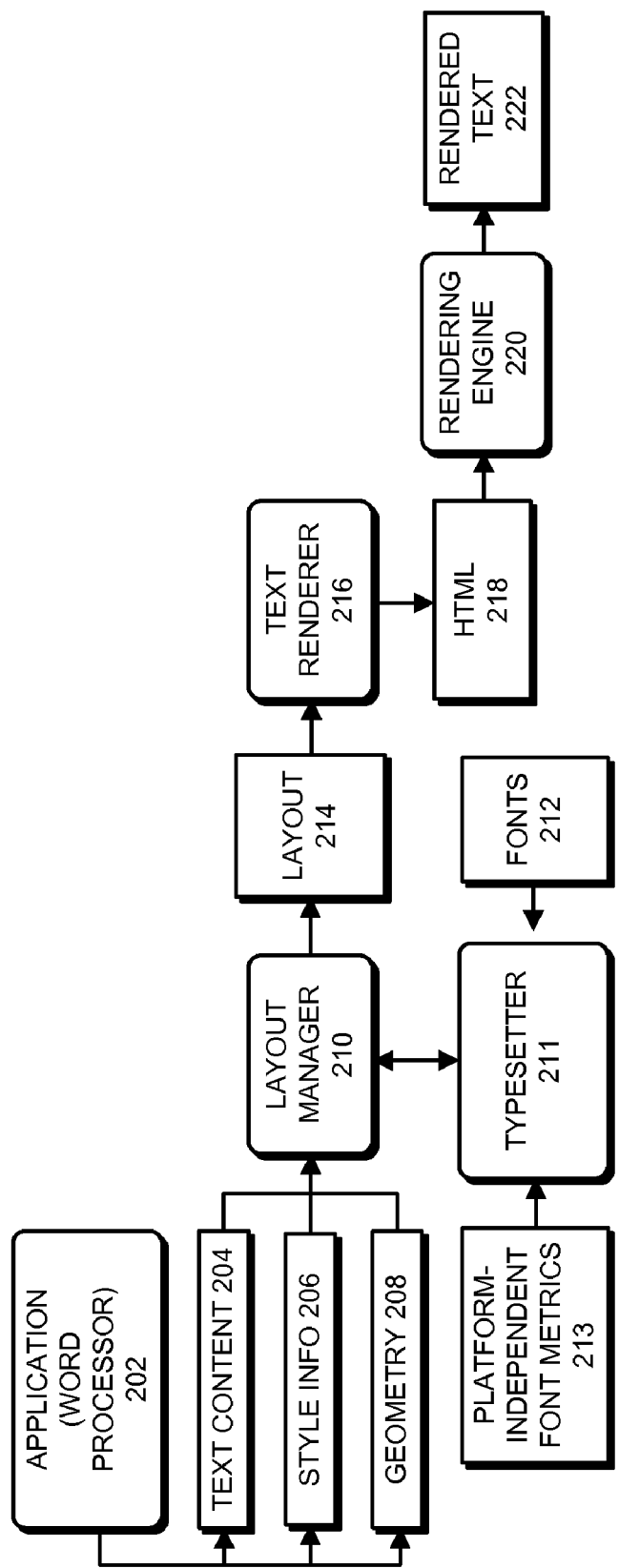
FIG. 2 illustrates the rendering process in accordance with an embodiment of the present invention.

FIG. 2 illustrates the rendering process in accordance with an embodiment of the present invention. First, an application 202, which seeks to display a document (for example, a word processor), sends information associated with the document to a layout manager 210. This information includes text content 204 and style information 206 for the document, as well as geometry information 208 specifying where the text is to be displayed in a user interface associated with application 202. In one embodiment, application 202 is a web-based word-processing application written in JavaScript™, which runs within a web browser.

Next, layout manager 210 makes calls to typesetter 211. Typesetter 211 uses fonts 212, which are stored locally on the computing platform, as well as platform-independent font metrics 213 obtained from a server, to position characters within line fragments and pages. This ultimately produces a layout 214 for the document, which specifies how the document is divided into line fragments and pages and also specifies the precise location for each character in a rendering of the document.

Next, text renderer 216 uses the layout information to render a visible portion of the document. This produces a representation of the rendered document in a platform-independent markup language, such as HTML 218. Finally, a rendering engine 220 associated with the browser renders HTML 218 to produce the rendered text 222. This process is described in more detail below, but first we describe how to generate the platform-independent font metrics.

Generating Platform-Independent Font Metrics

Figure 3A:
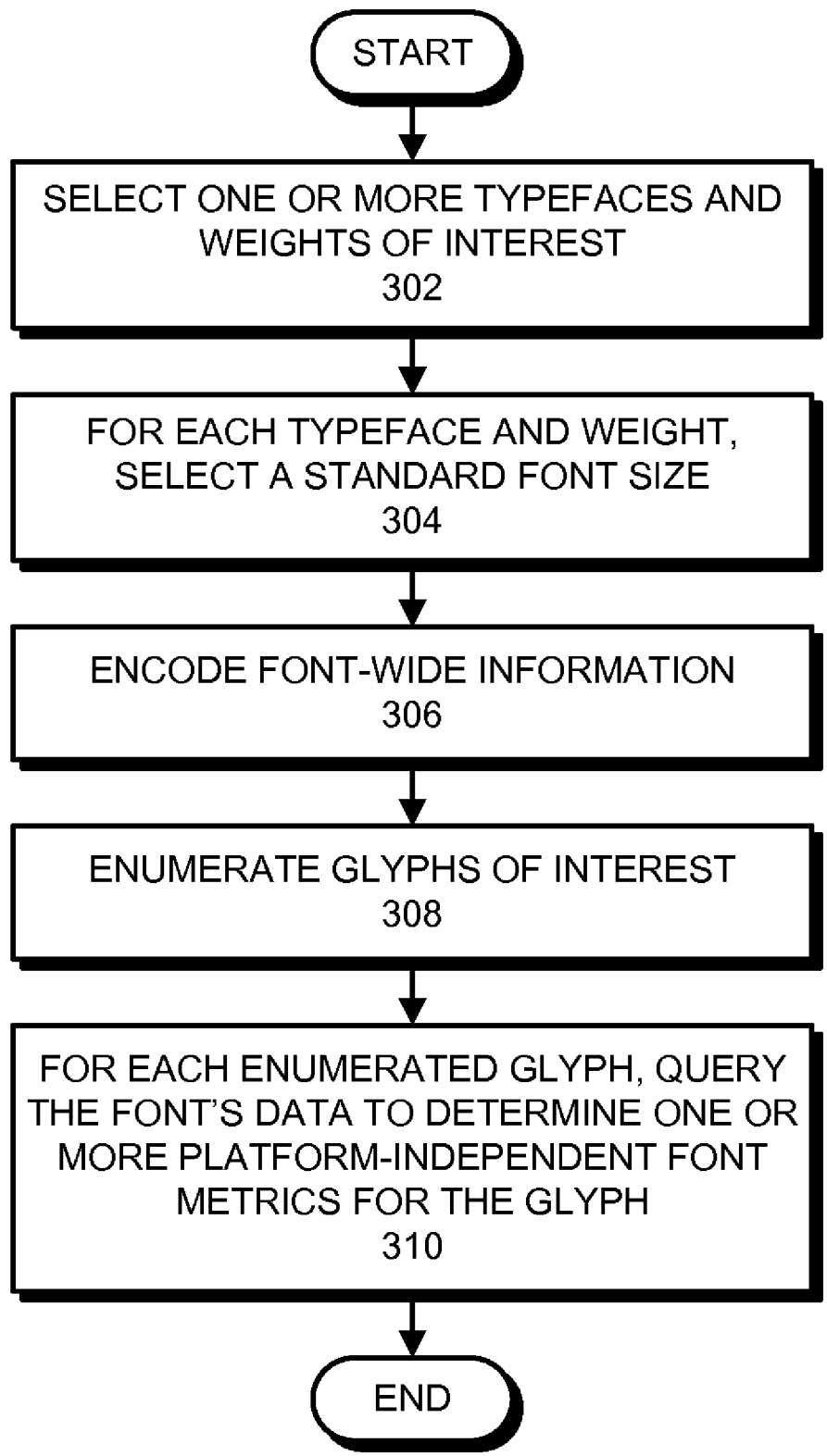
FIG. 3A presents a flow chart illustrating the process of generating font metrics in accordance with an embodiment of the present invention.

FIG. 3A presents a flow chart illustrating the process of generating platform-independent font metrics in accordance with an embodiment of the present invention. During this process, for each font of interest, the system pre-computes font metrics and stores them in an object, which can be downloaded to a browser as the font metrics are needed.

While pre-computing these font metrics, the system first selects one or more typefaces and weights of interest (step 302). (Note that a typeface is a set of one or more fonts designed with stylistic unity. For example, a given typeface, such as "Arial," may include regular, bold and italic fonts.) Next, for each typeface and weight, the system selects a standard font size which is a multiple of the largest font size that is likely to be rendered (step 304). For the most popular fonts like TrueType (OpenType) the system can obtain the standard font size from the font specification directly (the number of "font units per em square," which is a part of TrueType font specification and usually equal to 1024 or 2048, and defines an abstract space, in which all font and glyph metrics are described). Then concrete metrics for a given font size can be scaled from this standard font size. For example, if the standard font size is selected to be 1000, the font metrics for a font size of 16 pt can be determined by multiplying the standard font metrics by 16/1000.

Note that scaling font metrics from a standard font size to a given font size (like 16 pt) is not necessarily performed by the system component that generates platform-independent font metrics. This scaling can happen in the browser-based application on the client side, when it makes a layout of text using a given font size (e.g. 16 pt), retrieved from the style. Also, the problem of scaling fonts is generally a bit more complicated than just multiplying its metrics by a factor. This simple multiplication only works for sufficiently high resolutions and point sizes. As for the small point sizes, the TrueType font may contain some tables and instructions to improve rendered text quality. In doing so, it may be required to tweak glyph outlines, or even replace them by bitmap equivalents. These adjustments may affect the overall layout of rendered text, thereby making calculations based exclusively on glyph metrics incorrect. For example, the TrueType font may contain bitmaps of glyphs, which should be used instead of outline glyphs for particular (usually small) point sizes. The system can take this into consideration and convey corresponding data to the client to make certain that the client performs the layout adequately in the browser application.

Next, the system encodes font-wide information, such as the font weight, whether the font is italic or not, and the ascent and descent for the font at the standard font size (step 306).

After the font-wide information is encoded, the system enumerates a set of glyphs of interest (step 308). Note that a "glyph" is a graphical unit, whereas a "character" is a textual unit. In some cases, multiple characters will map to a single glyph. For example, in the case of a ligature, adjacent letters "f" and "i" will map to a single glyph "fi". In other cases, a single character is comprised of multiple glyphs. For example, a letter and an associated diacritical mark, such as á, may be comprised of separate glyphs.

Next, for each enumerated glyph, the system queries the glyph's associated font data to determine one or more metrics for the glyph (step 310). For example, the system can query to determine a bounding box for each glyph. The system can also query for the glyph's advancement, how far down and/or to the right the pen position should be moved after drawing the glyph. The system can additionally query for kerning pairs, which specify custom distances between ordered pairs of glyphs. For example, most fonts specify a kerning pair for the sequence "aw" because otherwise the "a" and the "w" would appear to be rendered too far apart.

The resulting font metrics can be stored in the object as is illustrated in FIG. 3B. Note that the data structure in FIG. 3B first specifies font-wide information, such as the family name, weight, ascent and descent, as well as the standard font size of 1000. Next, for each glyph, the data structure specifies the horizontal and vertical advancement, as well as parameters for the dimensions of a bounding box. Note that the data structure illustrated in FIG. 3B is a simplified data structure, which works well for relatively high point sizes, but does not take into consideration all possibly scalability issues. Additional scalability issues (such as the issues mentioned above) can be handled using different data structures.

Executing a Browser-Based Application

Figure 4:
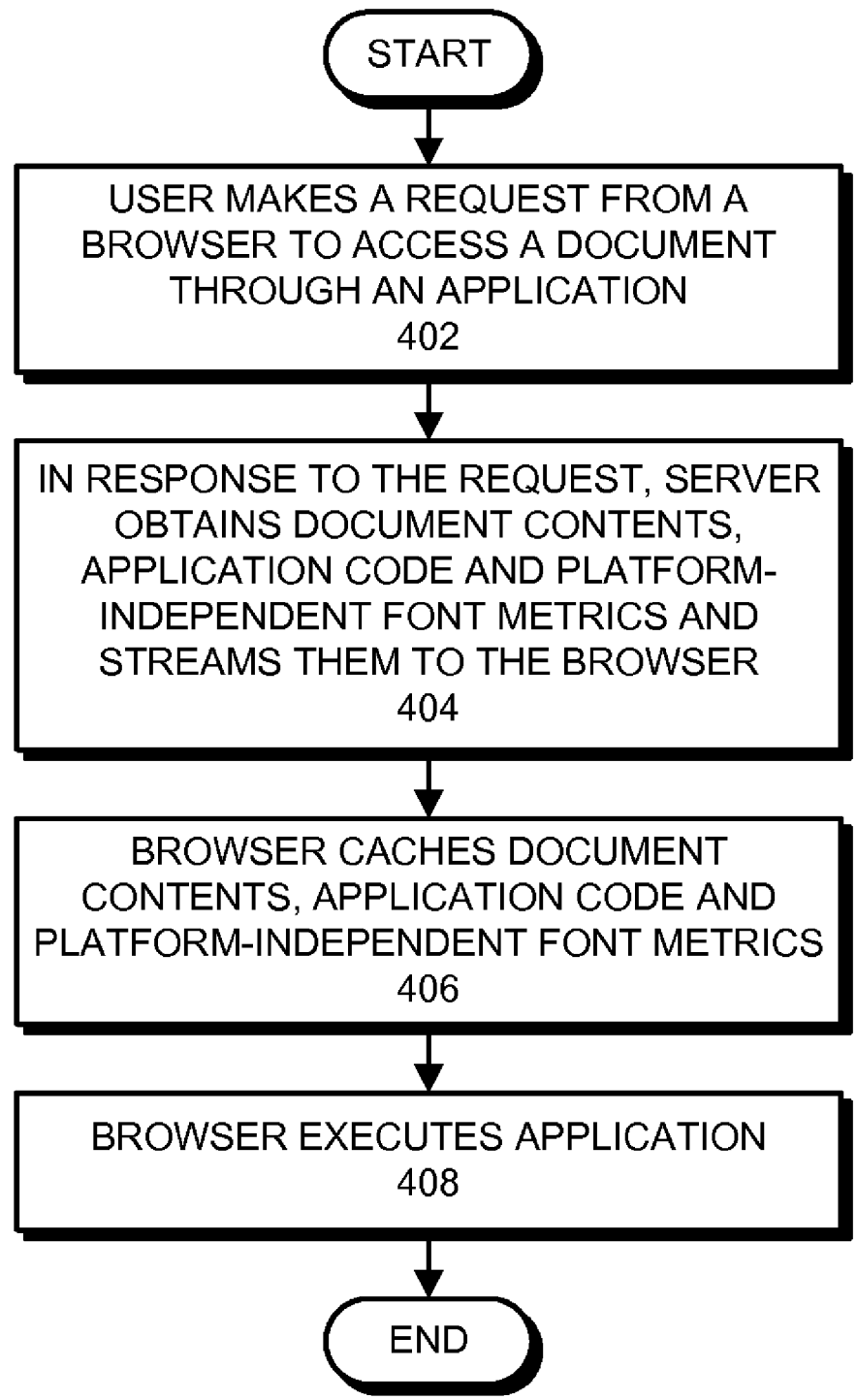
FIG. 4 presents a flow chart illustrating how a browser-based application executes in accordance with an embodiment of the present invention.

FIG. 4 presents a flow chart illustrating how a user executes a browser-based application which displays textual information in accordance with an embodiment of the present invention. Referring to FIG. 1, user 102 first makes a request through browser 114 to access a document through the application (step 402). For example, user 102 can request to edit a specific document through a browser-based word-processing application 116.

Next, in response to the request, server 110 obtains the document contents, platform-independent code for the application, and the platform-independent font metrics and streams them to the browser (step 404). More specifically, the document contents can include text and style information for the document. The platform-independent code for the application can include JavaScript™, which implements application logic for displaying the document contents and communicating with the server. The platform-independent code can also include code which implements the browser-based word-processing system. The platform-independent font metrics can include precomputed font metrics (represented in JavaScript Object Notion (JSON)) which can be used to determine the positions of individual characters in a rendering of the document.

Next, browser 114 caches the information received from server 110 (step 406). This enables browser 114 to execute the application using the cached information (step 408).

Using the Platform-Independent Font Metrics

Figure 5:
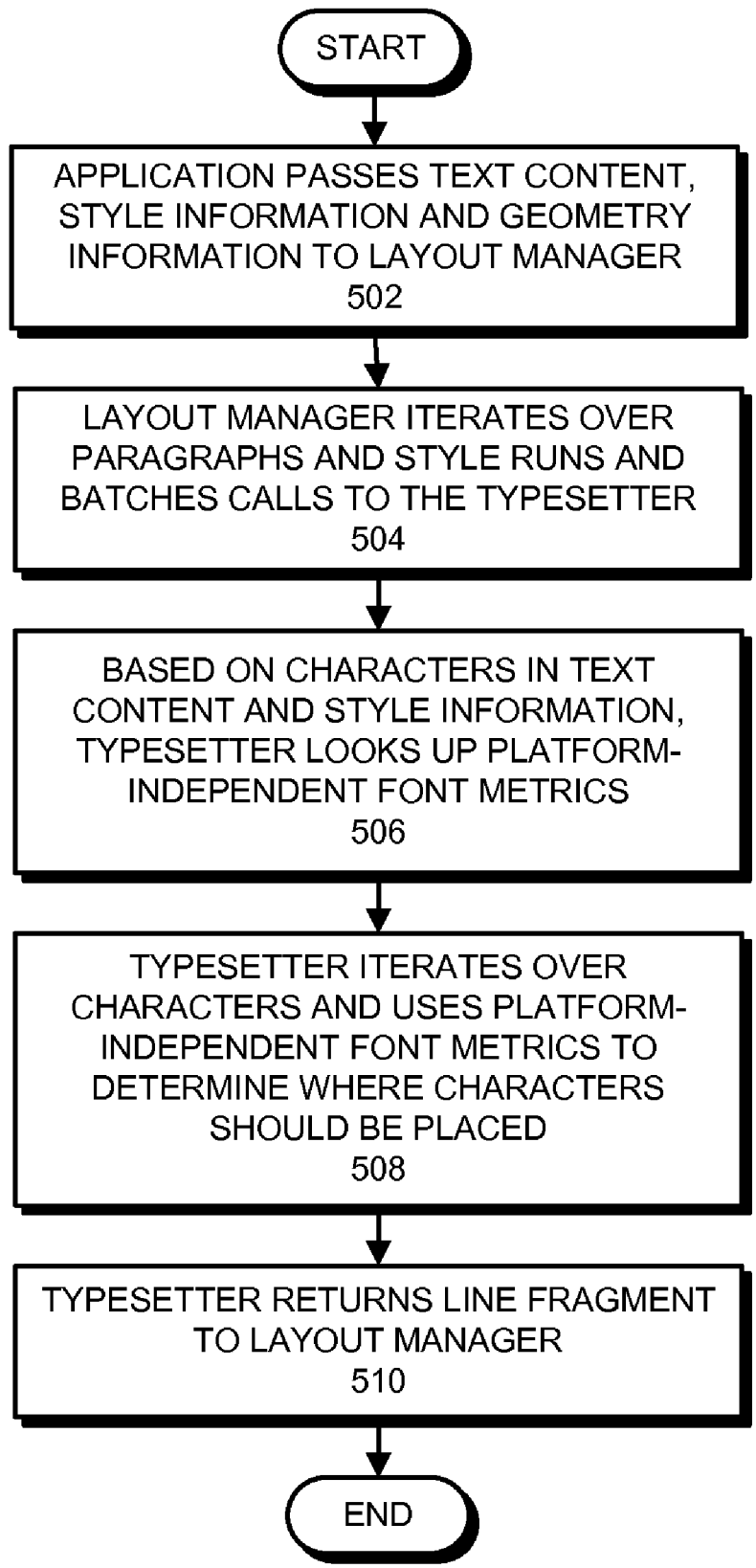
FIG. 5 presents a flow chart illustrating how the platform-independent font metrics are used to determine how a document will be divided into line fragments and pages in accordance with an embodiment of the present invention.

FIG. 5 presents a flow chart illustrating how the platform-independent font metrics are used to determine how a document will be divided into line fragments and pages in accordance with an embodiment of the present invention. When a browser 114 starts executing the application, the application first passes text content 204, style information 206 and geometry information 208 to layout manager 210 (step 502). Layout manager 210 then iterates over paragraphs and style runs and batches typesetting calls to typesetter 211 (step 504). Note that typesetter 211 processes each paragraph separately because there may exist specific paragraph formatting rules, such as paragraph-indenting and widow-line rules, which must be applied to each paragraph. Within each paragraph, typesetter 211 processes individual style runs, which comprise sets of contiguous characters that share the same font, size and style characteristics.

Based on the characters in text content 204 and style information 206, typesetter 211 looks up the relevant platform-independent font metrics (step 506). Next, typesetter 211 iterates over the characters to be displayed and uses the platform-independent font metrics to determine where the characters should be placed in the rendering (step 508). This can involve filling in a line fragment data structure, which has entries for characters. For example, each entry can include a Unicode character and a geometric position for the character. Next, typesetter 211 returns the line fragment to the layout manager 210 (step 510). Layout manager 210 repeats the above process until no more characters exist, or no additional characters can be fit into a specific geometric box. At this point, layout 214 is complete.

Text Rendering

Once layout 214 is generated, the system renders the text. This can be accomplished through a high-fidelity text rendering, which uses the determined division of the document into line fragments and pages and renders individual characters at their determined locations within the line fragments. It can also be accomplished through a lower-fidelity rendering, which also uses the determined division of the document into line fragments and pages. However, unlike the high-fidelity rendering, the lower-fidelity rendering does not use the determined locations for the individual characters, but instead allows the renderer to use platform-specific rendering mechanisms to determine the locations of the individual characters within the line fragments.

Moreover, note that the system only needs to render text which is visible. For example, in a word-processing application, only a portion of the document which is being currently viewed and edited needs to be rendered.

Figure 6:
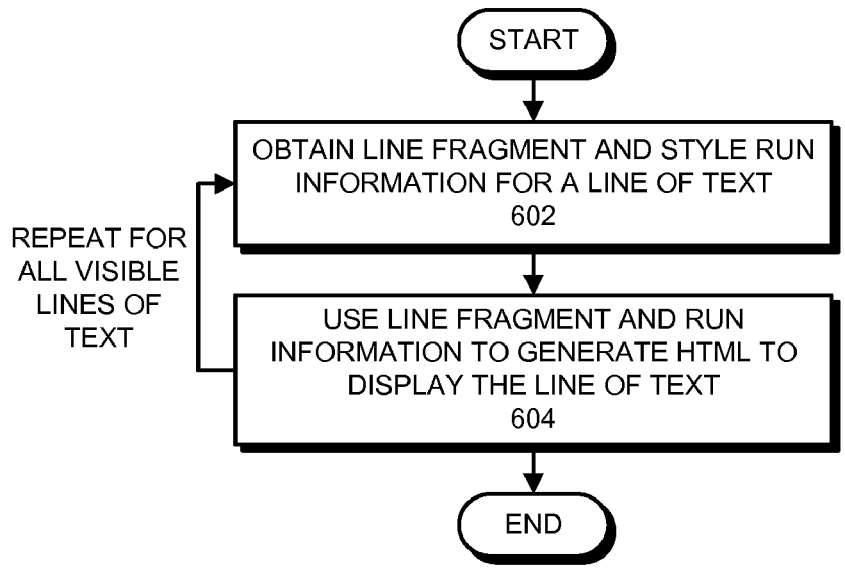
FIG. 6 presents a flow chart illustrating how text is rendered into HTML for the lower-fidelity rendering in accordance with an embodiment of the present invention.

FIG. 6 presents a flow chart illustrating how text is rendered into HTML for the lower-fidelity text rendering in accordance with an embodiment of the present invention. First, the system obtains line fragment and style run information for a line of text (step 602). Next, the system uses the line fragment and run information to generate HTML to display the line of text (step 604). For example, the system can use the following exemplary pseudo-HTML span tags to display a line of text.

```
<span font="Times", font size=12>
"line of text"
</span>
```

This process is repeated for all visible lines. Note that the system uses local platform-specific rendering mechanisms, such as a font system in a local operating system, to render the line of text. Hence, the platform-dependent rendering mechanisms will determine the locations of the individual characters within the line fragments, and these locations may not match the precomputed locations in layout 214. (This is especially true in the case of a font substitution which can occur when a specified font is lacking on a given platform.) However, the dividing of the document into line fragments and pages will be the same as the division specified in layout 214.

Figure 7:
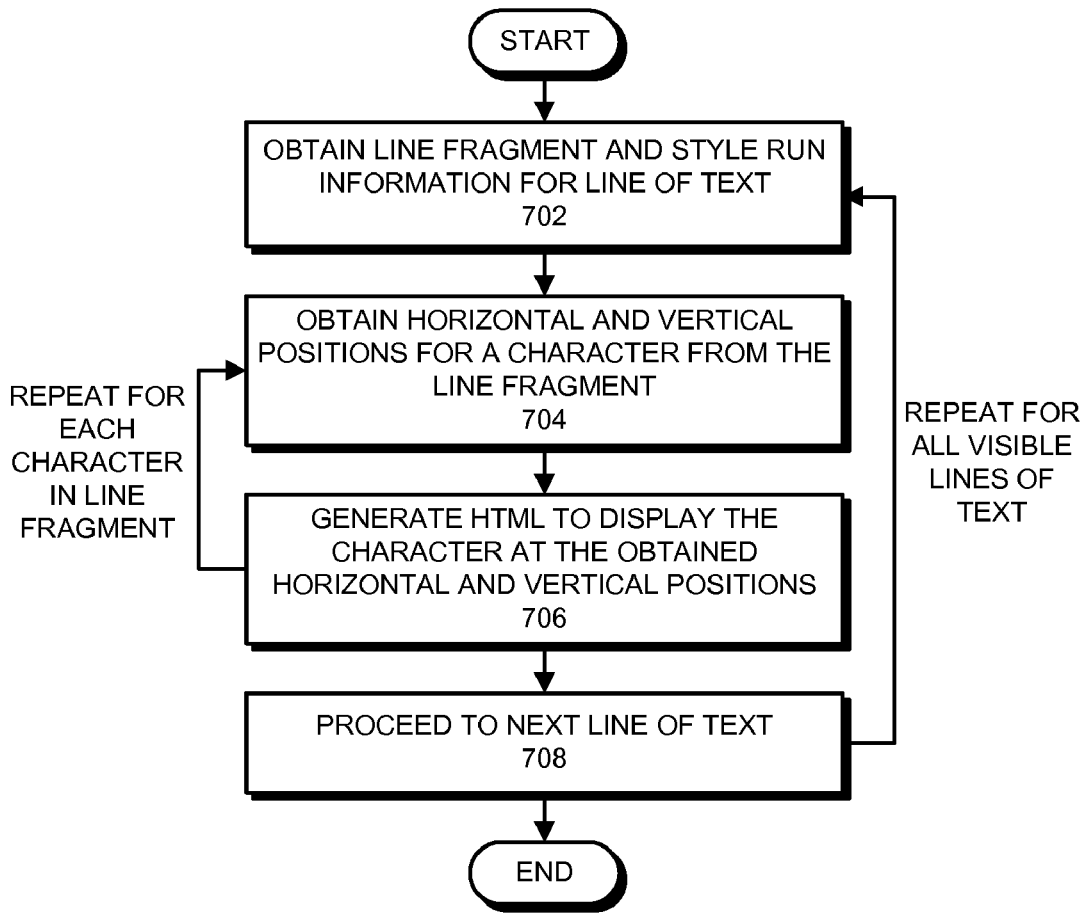
FIG. 7 presents a flow chart illustrating how text is rendered into HTML for the high-fidelity rendering in accordance with an embodiment of the present invention.

In contrast, FIG. 7 presents a flow chart illustrating how text is rendered into HTML using the high-fidelity text rendering in accordance with an embodiment of the present invention. First, the system obtains the line fragment and style run information for a line of text (step 702). Next, for each character in the line, the system obtains the precomputed horizontal and vertical positions for the character from the line fragment data structure (step 704). The system then generates HTML to display the character at the obtained horizontal and vertical positions (step 706). For example, the system can use the following exemplary pseudo-HTML div tags to display a single character at a specific location specified by an x position and a y position.

```
<div font="Times", font size=12, position=abs, x=xpos, y=ypos>
"Z"
</div>
```

This process is repeated for each character in the line of text. Next, if there exists another visible line of text, the system proceeds to process the next visible line of text (step 708).

Note that the instead of using the above-described high-fidelity and lower-fidelity rendering techniques, the system can alternatively use an intermediate-fidelity rendering technique, which renders individual words (instead of individual characters) at determined locations within the line fragments.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for typesetting and rendering a document in a platform-independent manner, comprising:
    obtaining the document, wherein the document includes text content and associated style information including one or more fonts;
    obtaining platform-independent font metrics for the one or more fonts, wherein the platform-independent font metrics include information that can be used to determine the positions of individual characters in a rendering of the document, wherein obtaining the platform-independent font metrics involves determining a set of glyphs of interest, and wherein, for each glyph in the set of glyphs of interest, the platform-independent font metrics specify at least one of:
        a horizontal and a vertical position of a bounding box for the glyph;
        a horizontal and a vertical size of the bounding box for the glyph; and
        a horizontal and a vertical advancement for the glyph, which specify how far horizontally and how far vertically a pen position moves after drawing the glyph;
    using the platform-independent font metrics to determine how the document is divided into line fragments and pages; and
    using the determined division while rendering the document, so that the division of the document into line fragments and pages is the same across different computing platforms.

2. The method of claim 1, wherein using the platform-independent font metrics to determine how the document is divided into line fragments and pages involves determining the locations of individual characters within the line fragments in the rendering of the document.

3. The method of claim 2, wherein rendering the document involves performing a high-fidelity rendering, which uses the determined division of the document into line fragments and pages and renders individual characters at the determined locations within the line fragments.

4. The method of claim 2, wherein rendering the document involves performing a lower-fidelity rendering, which uses the determined division of the document into line fragments and pages, wherein the lower-fidelity rendering does not use the determined locations for the individual characters, but instead allows the renderer to use platform-specific rendering mechanisms to determine the locations of the individual characters within the line fragments.

5. The method of claim 1, wherein rendering the document involves:
    generating code in a platform-independent markup language, which specifies the rendering for the document; and
    executing the code to render the document.

6. The method of claim 1, wherein rendering the document involves rendering only a visible portion of the document.

7. The method of claim 1, wherein the method is performed within a web browser.

8. The method of claim 7, wherein the method is performed by a platform-independent word-processing application that operates within the web browser.

9. The method of claim 1, wherein obtaining the platform-independent font metrics further involves:
   selecting one or more typefaces and weights;
   for each typeface and weight, selecting a standard font size;
   enumerating the set of glyphs of interest; and
   for each enumerated glyph and each font associated with the one or more typefaces, querying the font's data to determine one or more metrics for the glyph.

10. The method of claim 9, wherein for each glyph, the platform-independent font metrics take into account:
   glyph geometry, including height, weight and leading;
   white space;
   ligatures; and
   kerning pairs.

11. The method of claim 1, wherein the platform-independent font metrics are specified using:
   JavaScript Object Notation (JSON); or
   eXtensible Markup Language (XML).

12. An apparatus that typesets and renders a document in a platform-independent manner, comprising:
   a microprocessor;
   a layout manager configured to,
      obtain the document, wherein the document includes text content and associated style information including one or more fonts,
      obtain platform-independent font metrics for the one or more fonts, wherein the platform-independent font metrics include information that can be used to determine the positions of individual characters in a rendering of the document, and
      use the platform-independent font metrics to determine how the document is divided into line fragments and pages, wherein for each glyph in a set of glyphs of interest, the platform-independent font metrics specify at least one of:
         a horizontal and a vertical position of a bounding box for the glyph;
         a horizontal and a vertical size of the bounding box for the glyph; and
         a horizontal and a vertical advancement for the glyph, which specify how far horizontally and how far vertically a pen position moves after drawing the glyph; and
   a renderer configured to use the determined division while rendering the document, so that the division of the document into line fragments and pages is the same across different computing platforms.

13. The apparatus of claim 12, wherein while using the platform-independent font metrics to determine how the document is divided into line fragments and pages, the layout manager is configured to determine the locations of individual characters within the line fragments in the rendering of the document.

14. The apparatus of claim 13, wherein the renderer is configured to perform a high-fidelity rendering, which uses the determined division of the document into line fragments and pages and renders individual characters at the determined locations within the line fragments.

15. The apparatus of claim 13, wherein the renderer is configured to perform a lower-fidelity rendering, which uses the determined division of the document into line fragments and pages, wherein the lower-fidelity rendering does not use the determined locations for the individual characters, but instead allows the renderer to use platform-specific rendering mechanisms to determine the locations of the individual characters within the line fragments.

16. The apparatus of claim 12, wherein the renderer is configured to:
   generate code in a platform-independent markup language, which specifies the rendering for the document; and
   execute the code to render the document.

17. The apparatus of claim 12, wherein the renderer is configured to render only a visible portion of the document.

18. The apparatus of claim 12, wherein the layout manager and the renderer reside within a web browser.

19. The apparatus of claim 18, wherein the layout manager and the renderer are part of a platform-independent word-processing application that operates within the web browser.

20. The apparatus of claim 12, further comprising a font-metric-generation mechanism, wherein while generating the platform-independent font metrics, the font-metric-generation mechanism is configured to:
   select one or more typefaces and weights;
   for each typeface and weight, select a standard font size;
   enumerate the set of glyphs of interest; and
   for each enumerated glyph and each font associated with the one or more typefaces, query the font's data to determine one or more metrics for the glyph.

21. The apparatus of claim 20, wherein for each glyph, the platform-independent font metrics take into account:
   glyph geometry, including height, weight and leading;
   white space;
   ligatures; and
   kerning pairs.

22. The apparatus of claim 12, wherein the platform-independent font metrics are specified using:
   JavaScript Object Notation (JSON); or
   eXtensible Markup Language (XML).

23. A computer implemented platform-independent word processor that typesets and renders a document in a platform-independent manner, comprising:
   a microprocessor;
   a user interface configured to allow a user to edit a document, wherein the document includes text content and associated style information including one or more fonts,
   a layout manager configured to use platform-independent font metrics to determine how the document is divided into line fragments and pages, wherein the platform-independent font metrics include information that can be used to determine the positions of individual characters in a rendering of the document;
   a font-metric-generation mechanism, wherein while generating the platform-independent font metrics, the font-metric-generation mechanism is configured to determine a set of glyphs of interest, and wherein for each glyph in a set of glyphs of interest, the platform-independent font metrics specify at least one of:
      a horizontal and a vertical position of a bounding box for the glyph;
      a horizontal and a vertical size of the bounding box for the glyph; and
      a horizontal and a vertical advancement for the glyph, which specify how far horizontally and how far vertically a pen position moves after drawing the glyph; and
   a renderer configured to use the determined division while rendering the document, so that the division of the document into line fragments and pages is the same across different computing platforms.

24. The platform-independent word processor of claim 23, wherein while using the platform-independent font metrics to determine how the document is divided into line fragments and pages, the layout manager is configured to determine the locations of individual characters within the line fragments in the rendering of the document.

25. The platform-independent word processor of claim 24, wherein the renderer is configured to perform a high-fidelity rendering, which uses the determined division of the document into line fragments and pages and renders individual characters at the determined locations within the line fragments.

26. The platform-independent word processor of claim 24, wherein the renderer is configured to perform a lower-fidelity rendering, which uses the determined division of the document into line fragments and pages, wherein the lower-fidelity rendering does not use the determined locations for the individual characters, but instead allows the renderer to use platform-specific rendering mechanisms to determine the locations of the individual characters within the line fragments.

27. The platform-independent word processor of claim 23, wherein the renderer is configured to:
generate code in a platform-independent markup language, which specifies the rendering for the document; and
execute the code to render the document.

28. The platform-independent word processor of claim 23, wherein the renderer is configured to render only a visible portion of the document.

29. The platform-independent word processor of claim 23, wherein the platform-independent word processor is configured to operate within a web browser.

\* \* \* \* \*